Figure 1:
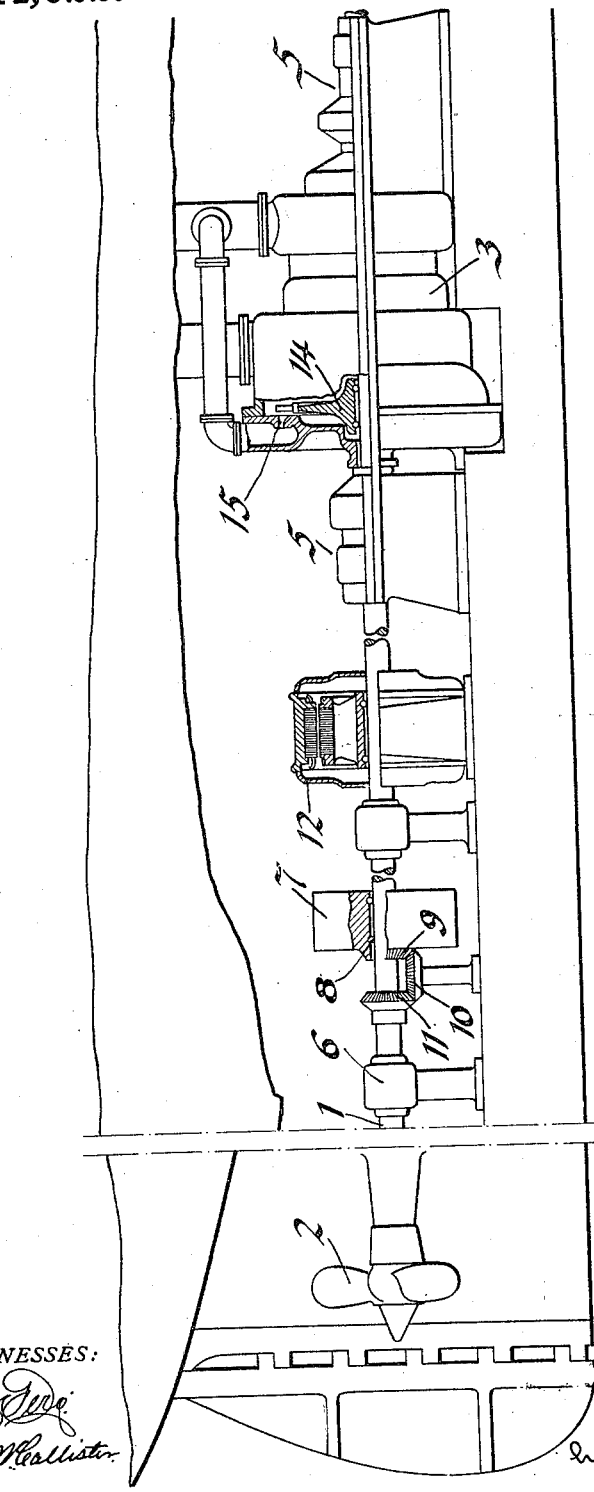

J. W. CLOUD.
MEANS OF TRANSPORT.
APPLICATION FILED AUG. 26, 1908.

1,044,022.

Patented Nov. 12, 1912.
3 SHEETS—SHEET 2.

WITNESSES:

INVENTOR.
John Wills Cloud
BY Jno. T. Green
his ATTORNEY IN FACT.

J. W. CLOUD.
MEANS OF TRANSPORT.
APPLICATION FILED AUG. 26, 1908.

1,044,022.

Patented Nov. 12, 1912.
3 SHEETS—SHEET 3.

WITNESSES:

INVENTOR.
BY John Wills Cloud his ATTORNEY IN FACT.

UNITED STATES PATENT OFFICE.

JOHN WILLS CLOUD, OF LONDON, ENGLAND.

MEANS OF TRANSPORT.

1,044,022.  Specification of Letters Patent.  Patented Nov. 12, 1912.

Application filed August 26, 1908. Serial No. 450,364.

*To all whom it may concern:*

Be it known that I, JOHN WILLS CLOUD, a citizen of the United States of America, and a resident of London, England, have made a new and useful Invention in Means of Transport, of which the following is a specification.

My invention relates to means of transport by land, water or air such as vehicles, ships and the like and in particular it relates to such means of transport as are provided with rotary mechanism of any kind such as propelling devices.

It is well known that when the orientation of the axis of a rotating body is changed stresses are developed which vary with the angular velocity of rotation, the moment of inertia of the body with respect to the axis of rotation, and the angular velocity with which the direction of the axis is changed. These stresses, if unbalanced, give rise to very considerable inconveniences and in some cases the deflecting forces thus produced may be exceedingly dangerous. Stresses of the kind referred to are developed in any vehicle or means of transport having rotating mechanism when it is steered for example, or in the case of a ship upon the water when it pitches or alters its course under the influence of the waves. In fitting propelling devices to ships it has already been proposed or practised to rotate similar engine shafts or propellers on the same as well as on parallel axes in opposite directions, but even when this is done the violent and dangerous vibrations which occur when the orientation of the axes of rotation is rapidly changed shows that either the counter-balancing is incomplete or that the framing between the parallel shafts is not sufficiently rigid or both. Similarly propelling devices have been fitted to vehicles for aerial navigation with shafts and propellers on the same and on parallel axes rotated in opposite directions in pairs, but recent occurrences of overturning of air ships when this arrangement has been employed and when the change of direction has been made more suddenly than usual show that the rotating masses are not all properly counterbalanced. It has also been proposed to protect automobile torpedoes against errors in direction occasioned by the gyroscopic action of the rotating parts by employing such rotating parts in equal pairs and by gearing them together so that they rotate in opposite directions. This arrangement, however, is for a purpose which, as will be hereinafter seen, is not the same as that of my invention, and it is only applicable when the driving mechanism is used in pairs. It has also been proposed in motor vehicles where energy is stored in rotating masses such as fly-wheels to rotate such masses in a direction opposite to the direction of rotation of some of the road wheels, for example in motor bicycles it has been proposed to gear the crank shaft to the driving wheel in such a manner that they rotate in opposite directions, whereby the gyroscopic action of the fly-wheel of the motor does not affect the steering of the vehicle. Also in motor driven vehicles such as tramcars and others, rotary masses, such as motor armatures, have heretofore been employed which are geared to the wheels so as to turn in opposite direction thereto; these, however, do not fulfil the conditions which my invention satisfies.

According to my invention I fully balance all rotating parts in vehicles of transportation where changes in direction must occur and I do not confine the method of doing so to the employment of equal driving mechanisms in pairs, but I provide means for balancing otherwise. I do this by counter-balancing the deflecting forces which would otherwise be set up by the employment of another mass or masses rotating in an opposite direction and having equal deflecting forces in the opposite direction so that the sum of such deflecting forces is substantially zero.

In some cases it is best and most convenient to arrange the counterbalancing masses to rotate about the same axis as the masses to be balanced, in other cases it may be better and more convenient to arrange the rotating masses on two or more parallel axes, the shafts being mounted in a rigid frame and geared together or otherwise so arranged that a constant ratio of speed is maintained between them. In both cases I provide that the deflecting forces of the system rotating in one direction are counterbalanced by the deflecting forces of the system rotating in the opposite direction so that the sum of such deflecting forces developed when any angular motion is given to the axes of rotation is substantially zero. When two such adjacent parallel shafts with the masses carried thereby are supported in a frame and are rotated in opposite directions with a constant speed ratio, the deflecting forces developed in one shaft and its attached mass by any change in the direction of the axes of the shafts is partly balanced by the opposite deflecting forces developed in the other shaft and its attached mass rotating in the opposite direction. There has, however, been no attempt made hitherto, so far as I am aware, to fully counterbalance these systems in vehicles of transportation where change in direction must occur by the employment of such masses, or such a ratio of speeds or such radii of gyration or a combination of them as will make the resultant forces substantially equal to zero. Where the frame is fixed in position no deflecting forces are developed, but in the case of a movable system, such as upon a vehicle of transportation or of flight or in any case where the direction of the axis of rotation is changed during rotation, important deflecting forces are developed which it is the object of my invention to counterbalance. For example, in the case of aerial navigation, it is a primary condition of successful operation that the deflecting forces of all rotating masses are evenly counterbalanced.

Similarly in the case of a ship upon the water it is important that the sum of deflecting forces should at all times be substantially zero.

The deflecting force of a rotating mass when the direction of the axis is changed is proportional to the mass multiplied by the square of the radius of gyration multiplied by the angular velocity of rotation and by the angular velocity of change of axis; consequently if two masses upon the same vehicle are rotating in opposite directions about the same or parallel axes with a constant speed ratio, by suitably arranging the masses and the radii of gyration respectively the deflecting forces may be accurately balanced.

In the drawings accompanying this application and forming a part thereof, I have illustrated several embodiments of my invention.

Figure 2:
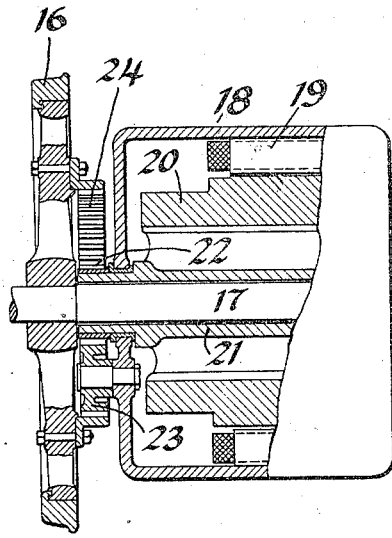
Figure 3:
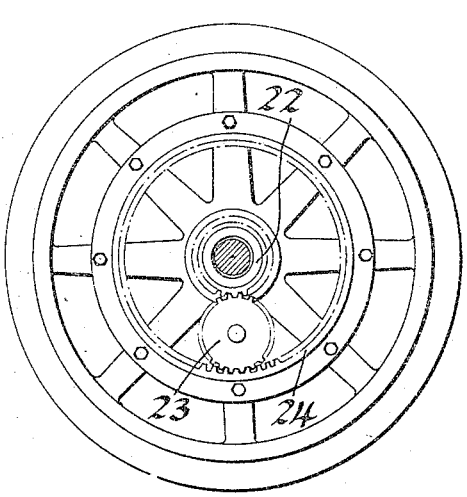
Figure 4:
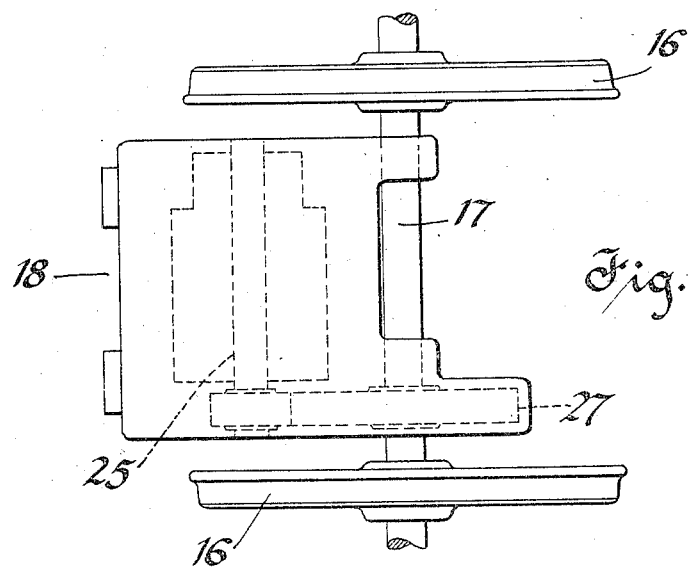
Figure 5:
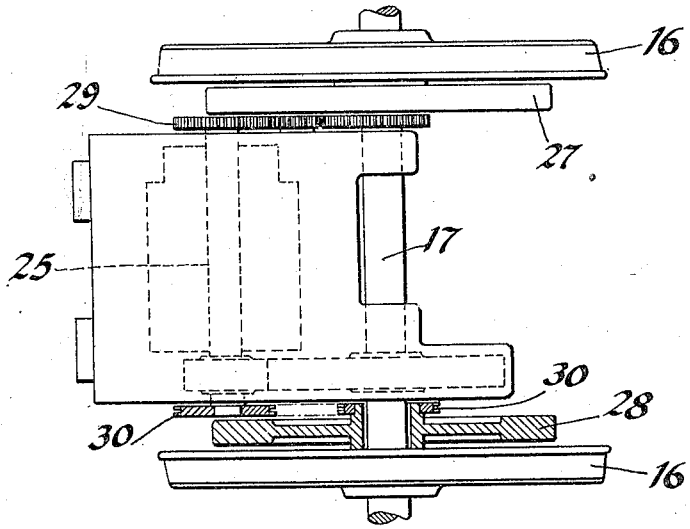
Figure 6:
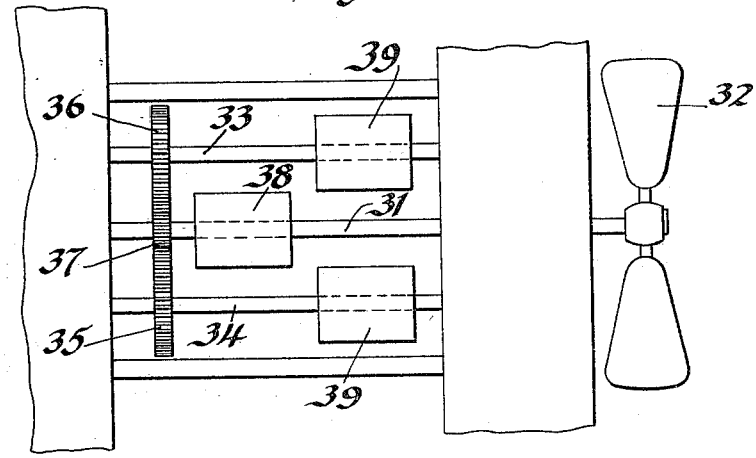

Figure 1 is a diagrammatic side elevation (portions of the apparatus being shown in section for convenience of description) of the propelling apparatus of a vessel; Fig. 2 is a view, partly in elevation and partly in section, of an electric motor operatively connected to a pair of co-axial wheels of a railway truck; Fig. 3 is a side elevation of the apparatus shown in Fig. 2; Fig. 4 is a plan view of a motor driven pair of railway traversing wheels in which the shaft of the driving motor is parallel but not concentric with the axle of the wheels; Fig. 5 is a plan view of an arrangement similar to Fig. 4 in which additional rotating masses are employed for the sake of counterbalancing the deflecting forces; and Fig. 6 is a plan view showing diagrammatically the propelling mechanism of an air ship, the propeller shaft being driven by two main engine shafts.

Referring to the drawings and particularly to Fig. 1: The propeller shaft 1 of a vessel is provided with a propeller 2 and is directly connected to the shaft of a turbine 3, which is shown in outline and which may be one of any type. The rotor element of the turbine is journaled in bearings 5 which are located at each end of the turbine casing and the propeller shaft 1 is provided with bearings 6 suitably disposed along the shaft.

A cylindrical mass 7 is rotatably mounted on the propeller shaft 1 and is adapted to counterbalance or counteract the deflecting forces which may be caused by the gyrostatic action of a portion of the propeller shaft and also of the propeller. This mass is mounted between adjacent bearings 6 and is provided with ball bearings which journal on the shaft 1. A beveled gear 9 is mounted on or integrally formed with the mass 7 and is driven, by the shaft, through beveled gears 10 and 11, in an opposite direction to the rotation of the shaft. The gear 11 is rigidly mounted upon the shaft. The beveled gears illustrated in the drawings are adapted to drive the mass 7 at the same speed as the shaft, consequently the mass is so proportioned that its moment of inertia is approximately equal to the moment of inertia of the propeller and the portion of the shaft 1 to be gyrostatically counterbalanced by it.

An electric motor 12 is mounted on the propeller shaft 1 and is located adjacent to one of the turbine bearings 5 and between it and one of the bearings 6. The rotor element of the motor is rotatably mounted by means of ball bearings on the shaft 1 and is adapted to rotate at such a speed as to counterbalance the gyrostatic deflecting forces of the remainder of the propeller shaft, and possibly a portion of the gyrostatic action of the turbine rotor. If necessary, additional mass may be attached to the rotor element of the motor. The motor is as simple in construction as possible and is preferably a synchronous motor, receiving current from a small generator driven from the shaft. Such an arrangement will adjust the speed of the motor to the speed of the shaft, but any type of motor may be employed and the current may be supplied from any suitable source.

A counterbalancing, fluid-impelled rotor element 14 is provided within the turbine casing. This element is provided with peripherally mounted turbine blades and is rotatably mounted, by means of ball bearings, on the shaft of the turbine. Fluid nozzles 15 are provided in the turbine casing and are arranged to deliver high pressure motive fluid from the main supplying the turbine to the blades of the element 14. The nozzles 15 and the blades of the element 14 are so arranged that the element is driven in an opposite direction to the turbine rotor. It is desirable to have the weight of the counterbalancing masses as low as is compatible with obtaining the requisite moment of inertia and, in order to keep these masses small, the velocity of rotation employed may be made higher than the velocity of rotation of the masses to be counterbalanced.

Although I have shown a number of arrangements for balancing the entire propeller shaft and its attached rotary masses (such as the turbine rotor and the propeller) it will be understood that a single mass may be employed for balancing the deflecting forces of the entire propelling system, or that several devices of the same character may be disposed along the length of the shaft, or even on one or more shafts extending parallel to the propelling shaft.

Referring to Figs. 2 and 3; a number of driving wheels 16 are rigidly secured to an axle 17 and are adapted to be driven by an electric motor 18. The field magnets 19 of the motor are supported and prevented from rotating in any suitable manner. The armature 20 is mounted on a sleeve 21, which surrounds the axle 17 and which is provided with suitable bearings supported by the frame portion of the motor. A gear 22 is provided on the sleeve 21 and meshes with a pinion 23, which is mounted on the frame portion of the motor and which, in turn, meshes with an internal gear 24, rigidly secured to one of the wheels 16. This driving gear is duplicated at each end of the shaft so that each wheel is positively driven by the motor. It will readily be seen that the rotary element 20 of the motor, the sleeve 21 and the gear 22 rotate in one direction, while the gears 24 and the driving wheel 16 rotate in the other direction.

The masses of the rotating elements are so proportioned with regard to their relative velocities and their respective radii of gyration, that the deflecting forces developed in the elements rotating in one direction, by an angular movement of the axle 17, are counterbalanced by the deflecting forces developed in the elements rotating in the opposite direction.

In the case of a railway vehicle, to which the elements shown in Figs. 2 and 3 are obviously applicable, angular motion will be imparted to the axle 17 at all curves as well as at places where a change in elevation of one rail is made.

In Fig. 4 I have again shown driving wheel 16 mounted on an axle 17 and operated by a motor 18. The spindle of the motor is indicated in dotted lines at 25, and while it is parallel to, it is not co-axial with the axle 17. The motor drives the axle 17 through gears 26 and 27 in the ordinary manner. In this instance the rotor element of the motor with its spindle and the gear 26 rotate in one direction, while the wheels 16, the axle 17 and gear 27 rotate in the other direction. The dimensions and the disposition of the masses of the oppositely rotating parts are arranged so that the deflecting forces acting on the spindle 25 are equal and opposite to the deflecting forces acting on the axle 17 when angular motion is imparted to the axle 17. In some cases it may be necessary to provide either the motor spindle 25 or the axle 17 with an additional mass or masses in order to increase the moment of inertia of the rotating parts to thereby obtain equilibrium of the gyrostatic deflecting forces.

Referring to Fig. 5, in which an arrangement somewhat similar to that shown in Fig. 4 is illustrated and in which the deflecting forces developed and transmitted to the axle 17 are greater than the deflecting forces transmitted to the spindle 25. I have therefore provided masses 27 and 28 (illustrated as fly-wheels) which are rotatably mounted on and are concentric with the axle 17. The fly-wheel 27 is located adjacent to one of the wheels 16 and is driven through a spur gearing 29 from the motor shaft 25. The other fly-wheel 28 is located adjacent to the other wheel 17 and is driven from the motor shaft 25 by means of a chain and wheels 30. These fly-wheels are, as has been stated, rotatably mounted on the axle 17 and have such moments of inertia and are driven at such velocities, in the opposite direction to the direction of rotation of the wheels 16, that they reduce the gyrostatic, deflecting forces developed by the axle 17 and the wheel 16, to an amount substantially equal to that developed by the gyrostatic action of the rotating elements of the motor. Consequently the sum total of all the gyrostatic deflecting forces due to the masses mounted on the spindle and the axle will be equal to zero and the system will be in gyrostatic equilibrium.

In Fig. 6 I have diagrammatically illustrated the propelling apparatus of a flying machine. The propeller shaft 31 of the machine is connected to parallel shafts 33 and 34 by the respective gears 35 and 36, which mesh with a gear 37 mounted on the shaft 31, and both the shafts 33 and 34 rotate in an opposite direction to the shaft 31. The propeller shaft may be driven by a suitable engine, which I have indicated by the rectangle at 38. It may be necessary to gyrostatically counterbalance the engine by securing a cylindrical mass 39 to each of the shafts 33 and 34. If desired, the cylindrical masses 33 and 34 may be replaced by suitable engines which are directly connected to the respective shafts 33 and 34 and which drive the shafts in the opposite direction to the direction of rotation of the shaft 31.

According to the present invention the moment of inertia of the three shafts and the masses which rotate with them on the same axes respectively and the velocities of rotation of the shafts are so proportioned that the sum of the deflecting forces developed by the three shafts, when an angular motion is imparted to the axes, will be equal to zero.

Any of the methods hereinbefore described may be employed for increasing or diminishing the deflecting forces developed by the shaft in order to obtain the desired equilibrium of the gyrostatic deflecting forces of the system; that is to say, masses such as fly-wheels may be mounted on any one of the parallel shafts in order to increase the moment of inertia of the system rotating in the direction of the shaft, or masses may be rotatably mounted on any one of the shafts and rotated in the opposite direction, as has been described with reference to Fig. 5, in order to diminish the effect of the deflecting forces developed by the system rotating in the same direction as the shaft.

What I claim is:

1. The method of counterbalancing the deflecting forces developed by the rotating mass included in the driving mechanism of vehicles of transport whenever an angular motion is given to the axis of rotation of said mass as when changes in direction of movement of the vehicle occur, which consists in counterbalancing the deflecting forces developed by such mass by opposing the same with equal deflecting forces developed by an unlike mass rotating synchronously therewith in an opposite direction.

2. The method of counterbalancing the deflecting forces developed by the rotating mass included in the driving mechanism of vehicles of transport whenever an angular motion is given to the axis of rotation of said mass, as when changes in direction of movement of the vehicle occur, which consists in counterbalancing the deflecting forces developed by such mass by opposing the same with equal deflecting forces developed by an unlike mass rotating synchronously therewith about the same axis in an opposite direction.

3. In vehicles of transport having driving mechanism employing a rotating mass and in which changes in direction of movement of the vehicle necessarily occur, means for counterbalancing the deflecting forces developed by such mass whenever an angular motion is given to its axis of rotation; said means comprising an unlike mass and means for rotating the same synchronously with the first mentioned mass and in an opposite direction about an axis at such rates of speed as will develop equal deflecting forces in an opposite direction to those developed by the mass of the driving mechanism.

4. In vehicles of transport in which changes in direction of movement of the vehicle necessarily occur, the combination with a driving mechanism employing a rotating mass, of means employing an unlike mass rotating in a direction opposite to the direction of rotation of the mass of the driving mechanism but synchronously therewith about the same axis, whereby the deflecting forces developed by the mass of the driving mechanism are counterbalanced.

5. In vehicles of transport in which changes in direction of movement of the vehicle necessarily occur, the combination with a driving mechanism employing a rotating mass, of means employing an unlike mass rotating in a direction opposite to the direction of rotation of the mass of the driving mechanism but synchronously therewith about the same axis, whereby the deflecting forces developed by the mass of the driving mechanism whenever an angular motion is given to its axis of rotation are counterbalanced.

6. In vehicles of transport in which changes in direction of movement of the vehicle necessarily occur, the combination with a driving mechanism employing a rotating mass, of means employing an unlike mass rotated in a direction opposite to the direction of rotation of the mass of the driving mechanism synchronously therewith and at such speeds as will counterbalance the deflecting forces developed by the mass of the driving mechanism.

7. In vehicles of transport in which changes in direction of movement of the vehicle necessarily occurs, the combination with a driving mechanism employing a rotating mass, of means employing an unlike mass rotated in a direction opposite to the direction of rotation of the mass of the driving mechanism synchronously therewith and at such speeds as will counterbalance the deflecting forces developed by the mass of the driving mechanism whenever angular motion is given to its axis of rotation.

8. In vehicles of transport in which changes in direction of movement of the vehicle necessarily occur, the combination with a driving mechanism employing a rotating mass, of a synchronous motor having its rotor rotated in a direction opposite to the direction of rotation of the driving mechanism but about the same axis whereby the deflecting forces developed by the driving mechanism are counterbalanced.

9. In vehicles of transport in which changes in direction of movement of the vehicle necessarily occur, the combination with a driving mechanism employing a rotating mass, of a synchronous motor having its rotor rotated in a direction opposite to the direction of the rotation of the driving mechanism but about the same axis whereby the deflecting forces developed by the mass of the driving mechanism whenever an angular motion is given to its axis are counterbalanced.

10. In vehicles of transport in which changes in direction of movement of the vehicle necessarily occur, the combination with a driving mechanism employing a rotating mass, of a synchronous motor having its rotor rotated in a direction opposite to the direction of rotation of the driving mechanism at such speeds as will counterbalance the deflecting forces developed by the mass of the driving mechanism.

11. In vehicles of transport in which changes in direction of movement of the vehicle necessarily occur, the combination with a driving mechanism employing a rotating mass, of means employing a mass rotating in a direction opposite to the direction of rotation of the mass of the driving mechanism but about the same axis and a synchronous motor having its rotor rotated in a direction opposite to the direction of rotation of the driving mechanism but about the same axis whereby the deflecting forces developed by the driving mechanism are counterbalanced.

12. In vehicles of transport in which changes in direction of movement of the vehicle necessarily occur, the combination with a driving mechanism employing a rotating mass, of means employing a mass rotating in a direction opposite to the direction of rotation of the driving mechanism and a synchronous motor having its rotor rotated in a direction opposite to the direction of rotation of the driving mechanism whereby the deflecting forces developed by the driving mechanism whenever an angular motion is given to its axis of rotation are counterbalanced.

13. In vehicles of transport in which changes in direction of movement of the vehicle necessarily occur, the combination with a driving mechanism employing a rotating mass, of means employing a mass rotating in a direction opposite to the direction of rotation of the driving mechanism and a synchronous motor having its rotor rotated in a direction opposite to the direction of rotation of the mass of the driving mechanism at such speeds as will counterbalance the deflecting forces developed by the mass of the driving mechanism.

14. In vehicles of transport in which changes in direction of movement of the vehicle necessarily occur, the combination with a steam turbine, of an unlike mass loosely mounted upon the same shaft as the rotor of the turbine, means for rotating said mass in a direction opposite to the direction of rotation of the turbine and in synchronism therewith whereby the deflecting forces developed by the turbine are counterbalanced.

In testimony whereof, I have hereunto subscribed my name this 12th day of August, 1908.

JOHN WILLS CLOUD.

Witnesses:
  OSCAR J. F. THORPE,
  ALAN S. HACKWOOD.